(12) United States Patent
Borras

(10) Patent No.: US 10,064,348 B1
(45) Date of Patent: Sep. 4, 2018

(54) LANDSCAPE BORDER SYSTEM

(71) Applicant: Orlando Borras, Haines City, FL (US)

(72) Inventor: Orlando Borras, Haines City, FL (US)

( * ) Notice: Subject to any disclaimer, the term of this patent is extended or adjusted under 35 U.S.C. 154(b) by 0 days.

(21) Appl. No.: 15/785,636

(22) Filed: Oct. 17, 2017

(51) Int. Cl.
| | |
|---|---|
| *A01G 9/20* | (2006.01) |
| *A01G 9/28* | (2018.01) |
| *A01G 1/08* | (2006.01) |
| *B05B 15/06* | (2006.01) |
| *A01G 25/00* | (2006.01) |
| *B05B 15/622* | (2018.01) |

(52) U.S. Cl.
CPC ............... *A01G 9/28* (2018.02); *A01G 1/08* (2013.01); *A01G 25/00* (2013.01); *B05B 15/062* (2013.01); *B05B 15/622* (2018.02)

(58) Field of Classification Search
CPC ......... A01G 1/08; A01G 25/00; B05B 15/062
USPC ................................................. 52/102, 169.5
See application file for complete search history.

(56) References Cited

U.S. PATENT DOCUMENTS

| | | | | |
|---|---|---|---|---|
| 3,485,449 | A | | 12/1969 | Wilson |
| 4,074,479 | A | * | 2/1978 | Krupka ............... A01G 9/28 52/102 |
| 4,185,429 | A | * | 1/1980 | Mendola ............... E02D 31/02 52/169.5 |
| 4,372,079 | A | | 2/1983 | Trageser |
| 4,698,135 | A | * | 10/1987 | Raab ................... A01G 25/00 202/234 |
| 4,702,034 | A | | 10/1987 | Ferguson et al. |
| 4,831,776 | A | * | 5/1989 | Fritch ................ A01G 9/28 47/33 |
| 4,863,307 | A | * | 9/1989 | Jones ............... E01C 11/221 404/7 |
| 4,897,973 | A | * | 2/1990 | Foster, Jr. ........... E02D 31/06 404/7 |
| 4,945,675 | A | * | 8/1990 | Kendrick ........... F21V 21/0824 47/33 |
| 5,038,811 | A | | 8/1991 | Gilmore |
| 5,067,273 | A | | 11/1991 | Richwine |
| 5,073,061 | A | * | 12/1991 | Jones ............... E01C 11/221 404/7 |

(Continued)

FOREIGN PATENT DOCUMENTS

| | | |
|---|---|---|
| EP | 1414124 | 6/2004 |
| WO | WO 03/069976 | 8/2003 |

*Primary Examiner* — Brian E Glessner
*Assistant Examiner* — Adam G Barlow
(74) *Attorney, Agent, or Firm* — Hanrahan Law Firm, P.A.; Benjamin M. Hanrahan

(57) ABSTRACT

A landscape bordering system is presented herein. In particular, the system is installed on the border or edges of lawn or grass, next to an adjacent sidewalk, walkway, paver, pavement, driveway, patio, fence, etc. The border includes a body defining a substantially flat top surface and an interior portion. A mounting assembly may be disposed on the interior of the body allowing for additional modules, such as sprinklers or lights, to be selectively installed therein. Additional features include a channel continuously disposed longitudinally along an outer exposed side of the top surface of the body. The channel may be disposed substantially proximate to a front edge of the top surface (e.g., adjacent to the edge of the grass or lawn). In this manner, a user may decide to spray, pour, or dispense an amount of herbicide or other chemical into the channel along the length of the border.

12 Claims, 4 Drawing Sheets

(56) References Cited

U.S. PATENT DOCUMENTS

| | | | |
|---|---|---|---|
| 5,157,867 A * | 10/1992 | Fritch | A01G 9/28 47/33 |
| 5,232,159 A | 8/1993 | Abbate, Sr. et al. | |
| 5,240,343 A * | 8/1993 | Strobl, Jr. | E01C 11/221 404/7 |
| 5,377,447 A | 1/1995 | Fritch | |
| 5,421,118 A * | 6/1995 | Bauer | A01G 9/28 47/33 |
| 5,501,044 A * | 3/1996 | Janesky | E04B 1/7023 404/4 |
| 5,605,416 A * | 2/1997 | Roach | E02B 3/02 405/21 |
| 5,746,375 A * | 5/1998 | Guo | B05B 15/622 239/245 |
| 5,921,021 A | 7/1999 | Coates | |
| 5,926,999 A * | 7/1999 | Vernon | A01G 13/105 43/121 |
| 5,930,947 A * | 8/1999 | Eckhoff | E02D 29/0225 47/33 |
| 6,099,201 A * | 8/2000 | Abbrancati | A01G 9/28 404/7 |
| 6,138,405 A | 10/2000 | Matz | |
| 6,173,906 B1 | 1/2001 | Von Kerens | |
| 6,195,956 B1 * | 3/2001 | Reyneveld | B28B 7/0017 264/163 |
| 6,237,293 B1 * | 5/2001 | Gembala | E04D 13/0431 52/302.6 |
| D448,498 S * | 9/2001 | Hulett | D25/164 |
| D455,504 S * | 4/2002 | Foster | D25/164 |
| D463,868 S * | 10/2002 | Foster | D25/164 |
| D464,149 S * | 10/2002 | Risi | D25/113 |
| 6,502,349 B1 | 1/2003 | Richet et al. | |
| 6,598,360 B1 * | 7/2003 | Pratt | E02D 31/02 52/169.5 |
| 6,616,383 B2 * | 9/2003 | Janz | E02B 3/04 405/21 |
| 6,619,001 B1 * | 9/2003 | Pratt | E02D 31/02 52/169.5 |
| 6,625,925 B1 * | 9/2003 | Foster | A01G 9/28 47/33 |
| 6,767,159 B2 * | 7/2004 | Jones | A01G 9/28 404/7 |
| 6,896,445 B1 * | 5/2005 | Engler | E02B 3/046 405/25 |
| 6,925,753 B1 | 8/2005 | Mallory | |
| 7,051,477 B2 * | 5/2006 | Burnham | A01G 9/28 47/33 |
| 7,380,374 B1 * | 6/2008 | Pratt | E02D 31/02 405/43 |
| 7,963,718 B2 * | 6/2011 | Zwier | E01C 11/221 404/7 |
| 8,186,127 B1 * | 5/2012 | Pratt | E02D 31/02 52/169.5 |
| 9,173,350 B1 | 11/2015 | Beutler | |
| 9,206,560 B2 * | 12/2015 | Alfieri | E01O 5/005 |
| 9,206,561 B2 * | 12/2015 | Alfieri, III | E01C 11/221 |
| 2001/0029709 A1 * | 10/2001 | Anderson | E02D 29/0233 52/102 |
| 2002/0078636 A1 * | 6/2002 | Whitson | A01G 9/28 52/102 |
| 2002/0121052 A1 * | 9/2002 | Olink | A01G 9/28 52/102 |
| 2003/0089031 A1 | 5/2003 | Wong et al. | |
| 2003/0163955 A1 * | 9/2003 | Harris | A01G 9/28 47/33 |
| 2005/0081437 A1 * | 4/2005 | Heinemann | A01G 9/28 47/33 |
| 2005/0183373 A1 * | 8/2005 | Mansour | E04B 5/046 52/596 |
| 2006/0043256 A1 * | 3/2006 | Bogrett | A01G 9/28 249/2 |
| 2007/0193112 A1 * | 8/2007 | Olink | A01G 9/28 47/33 |
| 2009/0223121 A1 * | 9/2009 | Jones | A01G 9/28 47/33 |
| 2013/0025194 A1 | 1/2013 | Adam | |

* cited by examiner

LANDSCAPE BORDER SYSTEM

FIELD OF THE INVENTION

The present invention is generally directed to a device or apparatus that can be installed or otherwise disposed about the border or edge of a lawn or other landscape section, e.g., along a sidewalk, walkway, driveway, flowerbed, trees, post, etc. In particular, the device can include an exposed top surface that provides a clean, generally smooth or at least partially flat surface and an herbicide channel. One or more sprinklers, lights, or other modules may be selectively installed or inserted within the border system in locations chosen on-site by the user or installer.

BACKGROUND OF THE INVENTION

Landscaping, particularly in the context of residential and commercial landscaping, can be referred to as the collection of various aesthetic items that form an area of land. This can include grass, sod, or lawn, as well as tress, bushes, flowers, and other flora or fauna, for example. Oftentimes, various lights and sprinklers are positioned throughout the land or yard in order to provide aesthetic appeal, particularly in the case of lighting, or for maintaining the landscape, such as in the case of sprinklers. The sprinklers can, in many cases, be substantially underground such that certain sprinkler heads will pop up at different times to provide water to the yard or landscape.

Additional maintenance of the landscape or lawn often requires the use of machinery or tools such as a lawn mower, edger, and in some cases a weed whacker or weed trimmer. For example, lawn mowers often cannot cut or trim grass near the edges of the landscape, for example, the grass adjacent a sidewalk, pavement, walkway, driveway, patio, fence, etc. This is mainly because the blade of a lawn mower is contained in the center-bottom portion of the mower, with the wheels disposed on the outer periphery. Thus, in order to trim or cut the grass or lawn around the edges, such as around or adjacent walkways, pavement, patios, fences, etc., additional tools such as an edger or weed trimmer may be needed.

There is thus a need in the art for a landscape bordering system that can be disposed or installed around the borders of residential and commercial landscapes, particularly around the borders of a lawn, and which can be aesthetically pleasing and can provide a clean border there about. The proposed border, in some cases, may allow a lawn mower to drive or roll there upon, thereby exposing the grass at the edges to the blade of the lawn mower. This can eliminate or at least reduce the need for additional equipment, such as edgers and weed trimmers, commonly used to trim the edges or borders of residential and commercial landscaping.

In addition, the proposed bordering system could provide a mounting assembly on an interior thereof, allowing for the selective installation of additional modules, including, but in no way limited to sprinklers, electrical lights, solar lights, etc. In some embodiments, the mounting assembly can span continuously along the border system, allowing the user to choose if and/or where to install the additional modules, as desired.

SUMMARY OF THE INVENTION

Accordingly, the present invention is directed to a landscape border that can be selectively installed around the border or edges of a lawn, for example, between the grass and an adjacent sidewalk, walkway, paver, pavement, driveway, patio, fence, etc. In other embodiments or cases, the border device of the present invention can be installed around or adjacent posts, poles, sprinkler heads, for example, either around the edges or outer border of the landscape or within the interior of the landscape or lawn. For instance, the border system or device of the present invention includes a body defining a substantially or at least partially flat top surface and an interior portion.

A mounting assembly may be disposed on the interior of the body allowing for additional modules, such as sprinklers, lights, etc. to be installed therein. In some cases, the mounting assembly includes two parallel and longitudinal rails that extend substantially or entirely along the length of the interior portion of the body. This allows the module(s) to be installed virtually anywhere along the length of the device, as selected by the user and/or as dictated by the particular situation or environment.

Additional features of some embodiments may include a channel continuously disposed longitudinally along an outer exposed side of the top surface of the body. The channel may be disposed substantially proximate to a front edge of the top surface (e.g., adjacent to the edge of the grass or lawn). In this manner, a user may decide to spray, pour, or dispense an amount of herbicide or other chemical into the channel along the length of the border. This can help eliminate or restrict the growth of weeds, grass, etc. over the top of the border and can therefore help maintain a clean edge of grass along the border.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
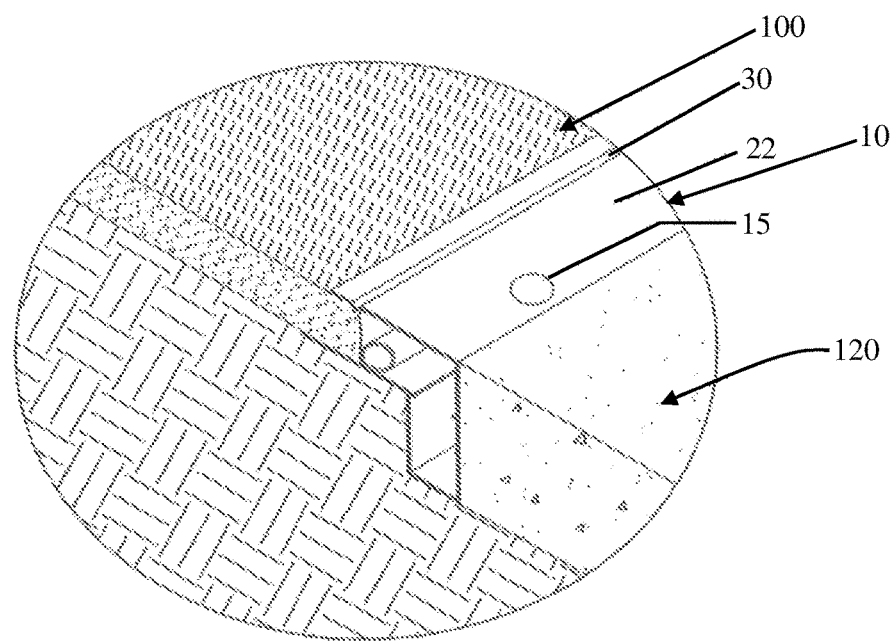
FIG. 1 is a partial sectional view of the landscape bordering system installed between a lawn and concrete barrier as disclosed in accordance with at least one embodiment of the present invention.
Figure 2:
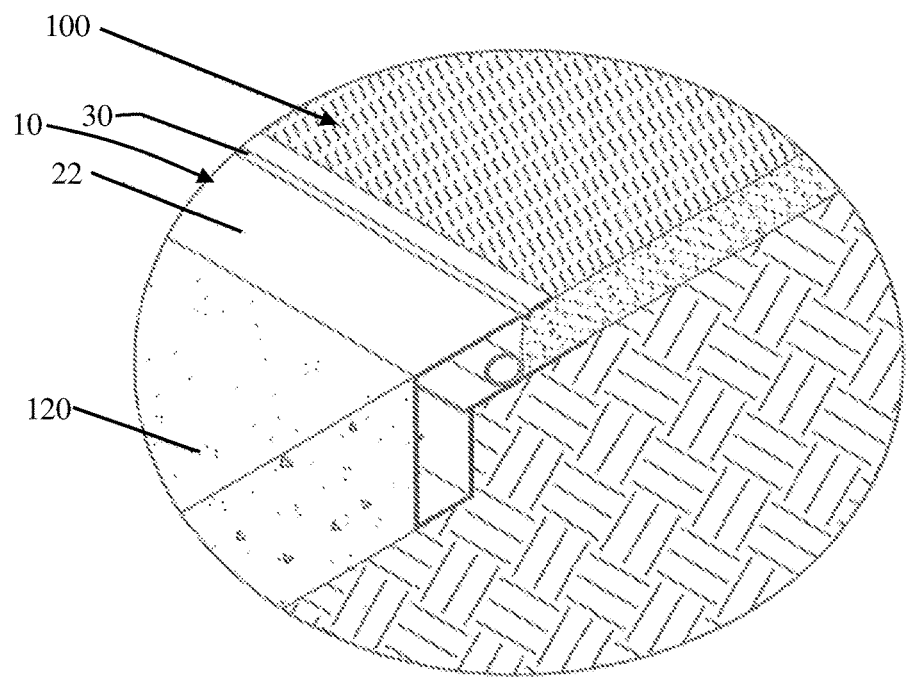
FIG. 2 is another partial sectional view of the landscape bordering system installed between a lawn and concrete barrier as disclosed in accordance with at least one embodiment of the present invention.

As shown in the accompanying drawings, and with particular reference to FIGS. 1 and 2, for example, the present invention is directed to a landscape bordering system, referenced as 10. In particular, the landscape bordering system 10 of the present invention includes a body 20 that is at least partially submerged or buried under ground and which provides a border in various landscaping designs.

Specifically, as shown in FIGS. 1 and 2, the system or device 10 of the present invention can be positioned between grass or sod, represented as 100 and an adjacent surface, generally represented as 120. As an example, the adjacent surface 120 may be concrete, pavement or bricks, and may represent or otherwise form a sidewalk, walkway, driveway, patio, etc. It should be noted that the bordering system and/or device 10 of the present invention can also be placed between other various portions of a landscape, such as, but not limited to, around or adjacent trees, bushes, flowerbeds, plants, planters, fences, posts, poles, sprinkler heads, etc. In this manner, the device 10 of the present invention may be disposed between mulch, wood chips, dirt, sand, concrete, brick, pavement, a house, building, etc., as desired or as the particular site or location warrants.

Figure 3:
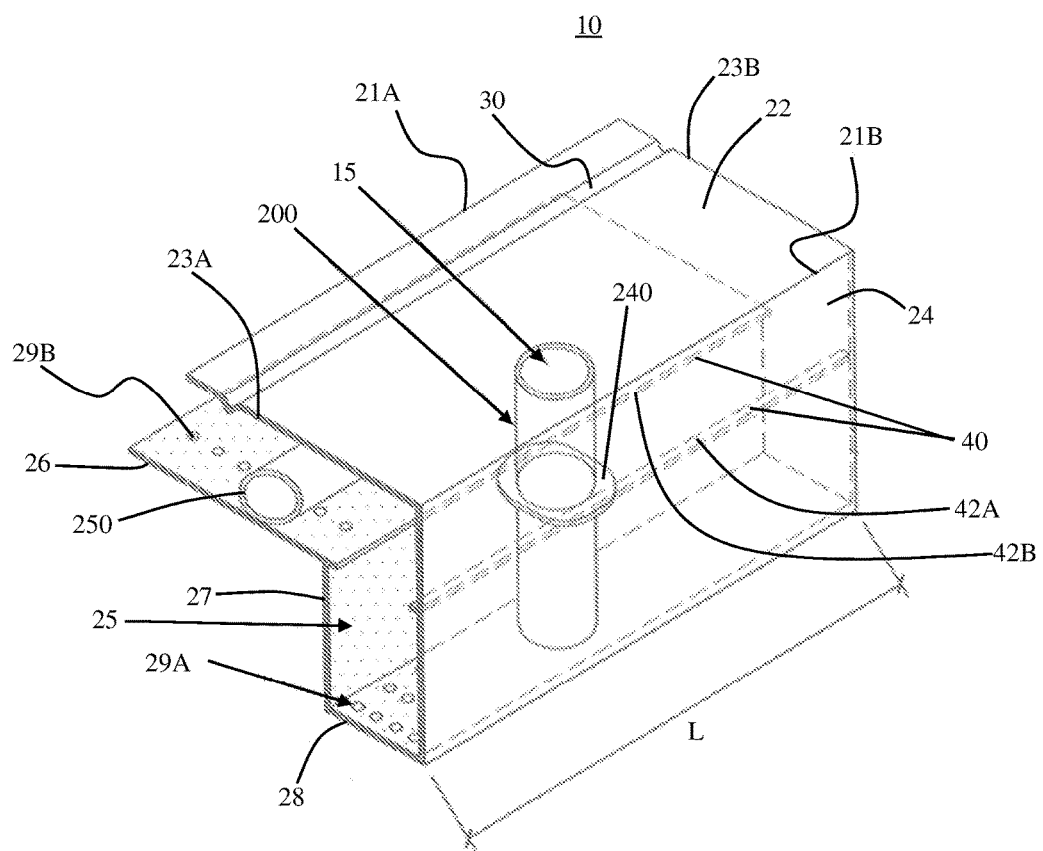
FIG. 3 is a rear perspective view of the landscape bordering system as disclosed in accordance with at least one embodiment of the present invention.

In any event, as will be described herein, the bordering system or device 10 of the present invention provides a clean, attractive border between two portions of a landscape, and can house one or more modules, such as sprinklers, hoses, water pipes, lights, electrical cables, wires, etc. Accordingly, with reference to FIG. 3, the device 10 of at least one embodiment includes a body 20 with a top surface or wall 22, a rear or back surface or wall 24, and one or more bottom surfaces or walls 26, 28. One or more upward or connecting walls or surfaces 27 may also be included, as shown in FIG. 3, for example. In this manner, the body 20 includes or otherwise defines an interior portion 25 via the various walls or surfaces 22, 24, 26, 27, 28, as shown in FIG. 3.

It should also be noted that in some embodiments, at least a portion of the interior 25 may be exposed or, in other words, as shown in FIG. 3, for example, the interior portion 25 may be at least partially open or otherwise not completely closed. For example, in the embodiment illustrated, the front end of the device 10 between the top surface 22 and one of the bottom surfaces 26 is open or at least partially open. As will be described herein, this can allow grass, sod, dirt, rocks, sand or other materials to packed into the front of the device 10, which in many cases can help anchor the device 10 down and remain in place.

In addition, the section illustrated in FIG. 3 is exemplary in nature in that the device can include a length, represented by L, of various sizes, for example, up to 12 feet. Other lengths, whether greater or less than 12 feet are contemplated within the scope of the present invention. In some embodiments, the device 10, and in particular the length of the device 10 can be cut or trimmed on-site or off-site in order to accommodate different situations and locations. In particular, the device 10 may be constructed of a material which can be cut with a saw, knife or other sharp instrument in order to facilitate custom installations for different dimensions or situations. For example, the device 10, and in particular the walls thereof, can be constructed of a plastic material, metal or metallic materials, PVC, etc.

Furthermore, still referring to FIGS. 1, 2 and 3, the top surface or top wall 22 of at least one embodiment of the present invention includes a front edge 21A that is positioned along grass, sod, or other adjacent surface, for example. Back edge 21B, disposed substantially parallel to the front edges 21A, can terminate at the back wall 24, as shown. With reference to FIGS. 1 and 2, the back wall 24 can be positioned adjacent or against another surface, such as concrete, pavement, bricks, etc.

As shown, the device 10 is disposed mostly underground, with other the top surface 22 exposed. In this manner, the back wall 24, and bottom walls 26, 28 are substantially or entirely underground, while the top surface 22 is at least partially exposed above ground. It is the top surface 22 that provides a clean, visually attractive border between the adjacent surfaces or materials, such as between the lawn 100 and an adjacent pavement. In this regard, the top surface 22 of at least one embodiment may include a substantially or at least partially flat or smooth surface, although some embodiments include a channel 30 and/or one or more installed modules 200, as will be described herein. It should also be noted that the top surface 22 may include other decorative effects such as having a textured surface, if desired.

Still referring to FIGS. 1 and 2, for instance, the top surface 22 may be substantially flat or even with the ground, or in some cases, may be just above ground level. The substantially flat top surface 22 allows a lawn mower to be simply driven over the top surface 22, thereby cutting the edge of the grass or lawn 100. For example, the wheels of a lawn mower can be passed over the top surface 22 of the device 10 while the blade of the lawn mower is able to cut the grass or lawn on the immediate edge of the device 10. Advantageously, this can significantly reduce the amount of time it takes to cut the lawn in that additional equipment, such as an edger or weed whacker, may not be needed.

Additionally, in some embodiments, a small or thin channel 30 may run along at least a portion of the top surface 22, such as along or upon an outer exposed side of the top surface 22. The channel 30 can prevent or restrict the growth of plants, grass, weeds, or other foliage over the top of the top surface 22. In particular, a user or individual may spray, sprinkle, or otherwise distribute an amount of herbicide, weed killer(s), chemical(s), etc., whether liquid, gel, solid, granules, or otherwise, into the channel 30. In this manner, the herbicide or other chemical, for example, can be retained at least temporarily within the channel 30 to prevent or restrict the growth of grass, weeds, or other foliage there upon.

In at least one embodiment, the channel 30 is disposed proximate to and substantially parallel to the front edge 21A of the top surface 22, as illustrated, for example, in FIG. 3. Furthermore, in some embodiments, the channel 30 may extended entirely or otherwise continuously along the top surface 22, for example, in a longitudinal manner, between oppositely disposed side edges 23A, 23B. It should also be noted that in some implementations, the channel 30 may include a "v" shaped configuration such that the bottom of the channel defines a point or apex, however, other shapes and sizes of the channel 30 are contemplated within the full spirit and scope of the various embodiments presented herein.

Further features of at least one embodiment of the present invention include the ability to selectively install one or more modules 200 (such as, but not limited to sprinklers, lights, solar lights, etc.) within the device 10. Specifically, the device 10 of at least one embodiment may further include a mounting assembly 40 disposed within the interior portion 25 thereof. A module 200 with corresponding mounting component(s) 240 can be installed through the top surface 22 (e.g., through a hole or opening created in the top surface 22) and into an engagement with the mounting assembly 40.

For instance, the mounting assembly 40 may be constructed such that only modules 200 comprising a corresponding or proprietary mounting component(s) 240 can be used in connection with the device 10 of the present invention. In this regard, modules 200 may be separately purchased or otherwise selectively installed, as desired, or otherwise as necessary in accordance with the particular application or situation.

In any event, in some embodiments, the mounting assembly 40 may span substantially or entirely along the interior portion 25 of the device 10, for example, longitudinally between opposite ends 23A, 23B. This allows the one or more modules 200 to be installed virtually anywhere along the top surface 22 between the edges 23A, 23B, so long as it is in alignment with the mounting assembly 40. For instance, in at least one embodiment, a user may create a hole or opening (represented as 15) along the top surface 22 where he or she wants to install a module 200 (such as a sprinkler, light, etc.) This hole 15 can be drilled, cut, or punched out, for example, on site by the user or off site. With the hole or opening made, the module 200 can be inserted into the device 10, extending at least partially into the interior portion 25 thereof, and into engagement with the mounting assembly 40. In some cases, additional connections may need to be made, such as, connection with a water pipe or electrical wires that may also be located within the interior portion 25.

For example, with reference to FIG. 3, the mounting assembly 40 may include at least one rail 42A, 42B extending longitudinally along the interior 25 of the device 10. One of the rails 42A may extend off of the back wall 24 and another rail 42B may be substantially parallel to first rail 42A defining a space there between. The module 200, such as the sprinkler or light, may include a corresponding mounting component 240, such as a platform or engaging wings that extend from the module 200 and is configured to engage with the mounting assembly 40. In particular, and still referring to FIG. 3, in at least one exemplary embodiment, the mounting component 240 may comprises a platform or protrusions that flare out on opposite sides of the module 200. This allows the module 200 to be inserted into the interior portion 25 (for example, through the hole 15 created or drilled on-site), and once the protrusions clear or pass beyond the longitudinal rails 42A, 42B, the module 200 can be twisted or rotated, for example, 90 degrees, such that the protrusions or platforms align under the rails 42A, 42B. Thus, if the module 200 were to be lifted upwards, the engagement between the rails 42A, 42B and the platform of the module 200 would prevent or restrict the upward movement of the module 200.

It should be noted that other mounting assemblies 40 disposed within the device 10 and corresponding mounting components 240 contained on the module(s) 200 are contemplated within the full spirit and scope of the present invention.

Furthermore, in at least one embodiment, the interior portion 25 of the present invention is defined by or otherwise includes a lower extended portion 25A and an intermediate portion 25B. The lower extended portion 25A extends downward near or adjacent the back wall 24, and in some cases, is defined by at least a portion of the back wall 24, a bottom surface 28, and an upward or connecting wall 27. In some embodiments, the lower portion 25A is at least partially below the mounting assembly 40 and includes a plurality of drainage holes 29A. The drainage holes 29A allow fluids, such as water, to drain there through and into the surrounding ground surface.

Moreover, the intermediate portion 25B of the interior 25 may be defined by an intermediate bottom surface 26 and at least a portion of the top surface 22. As mentioned herein, in some embodiments, the front of the device 10 may be open or at least partially open, as shown in the drawings. This allows dirt, rocks, sand, or grass, for example, to be disposed at least partially into the intermediate portion 25B, which can help anchor the device 10 to the ground, as shown in FIGS. 1 and 2, for example. The intermediate portion 25B may also include a plurality of holes 29B, for example, on the bottom surface 26 thereof. These holes 29B can be used for drainage purposes, as well, however, in other embodiments, grass roots or other plant roots may grow through the holes 29B in the intermediate portion. This can be used to even further facilitate anchoring of the device to the ground. For instance, since the device 10 is placed against or adjacent grass or lawn, the holes disposed in the intermediate portion 25B near the front of the device may facilitate the grass or lawn adjacent the front edge to grow roots there through.

In addition, with reference to FIGS. 1, 2, and 3, one or more pipes 250, such as water or other fluid pipes may be disposed longitudinally within the interior portion 25 of the device 10. Although the drawings show pipes 250 disposed in the intermediate portion 25B, other locations within the device 10 are contemplated. In any event, the pipe(s) 250 may be used to connect one or more sprinklers or other modules 200 thereto. For example, with reference to FIG. 4B, the sprinkler(s) 200 may include a bracket such as a t-bracket, that allows each of the sprinklers to fluidically interconnect to the water supply pipe 250. In other embodiments, electrical wires, data wires, etc. may be disposed within the interior portion 25 of the device 10, for example, to supply power to or otherwise connect to other modules 200 such as lights.

Figure 4A:
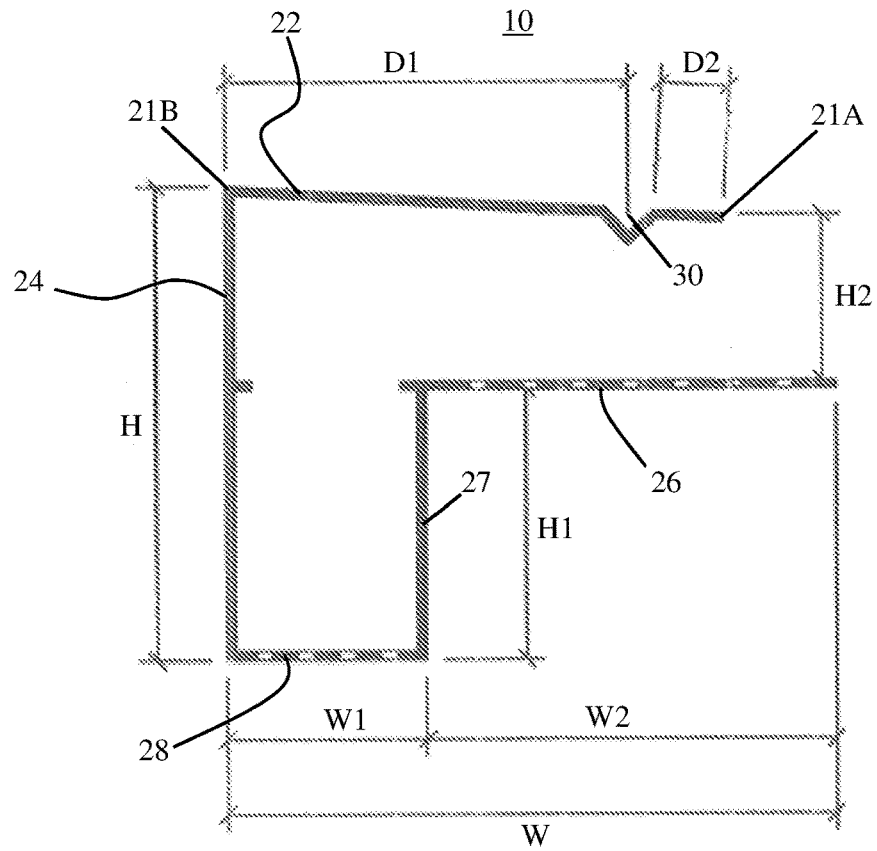
FIG. 4A is a side cross sectional view of the landscape bordering system as disclosed in accordance with at least one embodiment of the present invention.
Figure 4B:
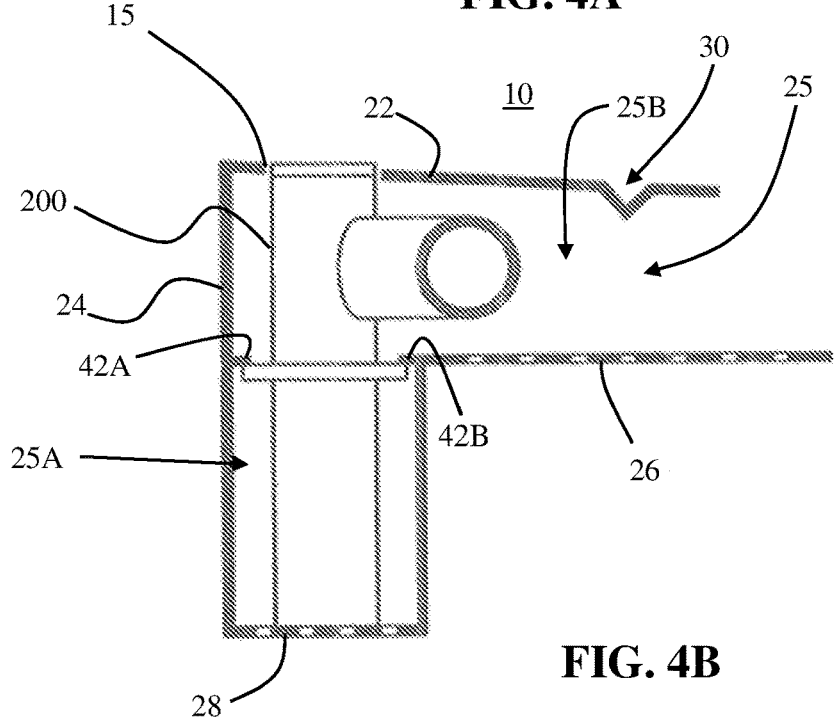
FIG. 4B is another side cross sectional view of the landscape bordering system as disclosed in accordance with at least one embodiment with a sprinkler head and t-bracket installed therein.

With reference to the side cross sectional views illustrated in the drawings, e.g., FIGS. 4A and 4B, additional structural features are shown or otherwise apparent. For instance, in some embodiments, the top surface 22 may taper slightly downward from the back surface 24 or back edge 21B to the front edge 21A. In this regard, the top surface 22 may not be completely level, at least in the resting orientation, but may instead slope slightly downward, as shown. With grass, dirt, or other items disposed between the top surface 22 and the intermediate bottom surface 26, for example at the end or proximate edge 21A, the top surface 22 may bend or flex upward, although in some embodiments or implementations is may not.

Furthermore, as also shown in the cross sectional views, such as FIGS. 4A and 4B, the intermediate bottom surface 26 of at least one embodiment may extend further outward than the top surface 22. In this regard, the end or outer edge of the intermediate bottom surface 26 may be extended further outward than the outer edge 21A of the top surface 22. This allows provides a surface 26 in which the grass or sod can grow in a manner such that the roots of the grass may extend through the intermediate bottom surface 26, for example, through holes 29B. This can help secure or anchor the device 10 to the ground and in place.

In addition, the front edge 21A of the top surface 22 may, in some cases, be slightly bent or angled (not shown) upward relative to the substantially or at least partially flat top surface 22. For instance, the section of the top surface between the channel 30 and the edge 21A may be bent or angled slightly upward, although in some embodiments, the angled portion may begin at or on the other side of the channel 30 (wherein the channel is on the portion of the top surface 22 that is slightly angled upward. This slight upward angle of the front edge 21A or portion of the top surface 22 adjacent the front edge 21A can facilitate the growth of grass beneath the top surface 22 to be angled outward toward the opening. For instance, grass may grow beneath the top surface 22 and extend roots through holes 29B. The top surface 22, and in some embodiment, the slightly bent or angles edge 21A (not shown) of some embodiments may force the grass to grow at an angle stating at the holes 29B and angled outward toward the opening or outer edge 21A. This keeps the grass off of the top surface 22, such as the outer exposed side of the top surface 22, and also allows a lawn mower to easily cut the grass as it passes over the border device 10.

Moreover, still referring to FIG. 4A, the width W, measured from the back surface 24 to the outer end of the intermediate bottom surface 26 may be approximately four and a half inches, wherein the width of the intermediate bottom surface W2 is approximately three inches, and the width of the lower bottom surface 28 is approximately one and a half inches. Along these lines, the width of the top surface 22 referenced as D1 and D2, may be approximately three and a half inches, wherein D1 is about three inches and D2 is about one half inches. In this manner, the intermediate bottom surface 26 may extend about an inch beyond the outer or front edge 21A of the top surface.

Still referring to FIG. 4A, the height H of at least one embodiment measured along the back surface 24 may be approximately three and a half inches. Also, the height of the connecting surface 27 may be about two inches and the opening between the end 21A of the top surface 22 and the intermediate bottom surface 26, referenced as H2, may be about one and one-quarter inches. In this manner, the taper or downward slope of the top surface 22 from the back edge 21B to the outer or front edge 21A may be approximately one-quarter of an inch.

It should be noted, however, that these dimensions and measurements are provided as exemplary only and should not be considered limiting in any manner as other dimensions and measurements may be implemented within the full spirit and scope of the present invention.

Figure 5A:
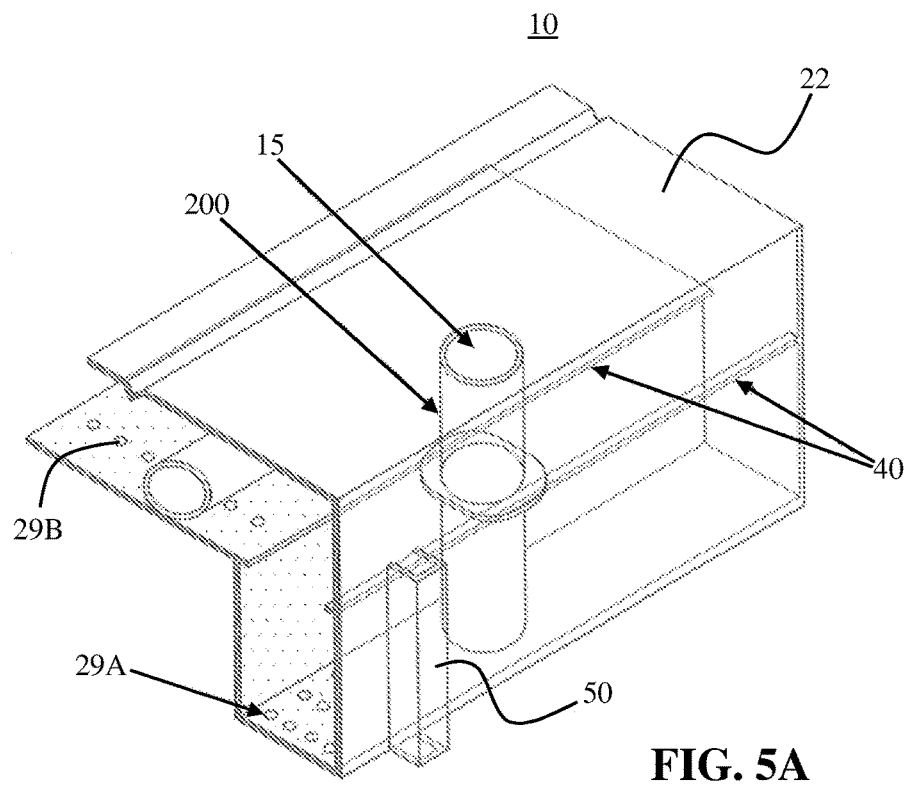
FIG. 5A is a rear perspective view of the landscape bordering system as disclosed in accordance with another embodiment of the present invention.
Figure 5B:
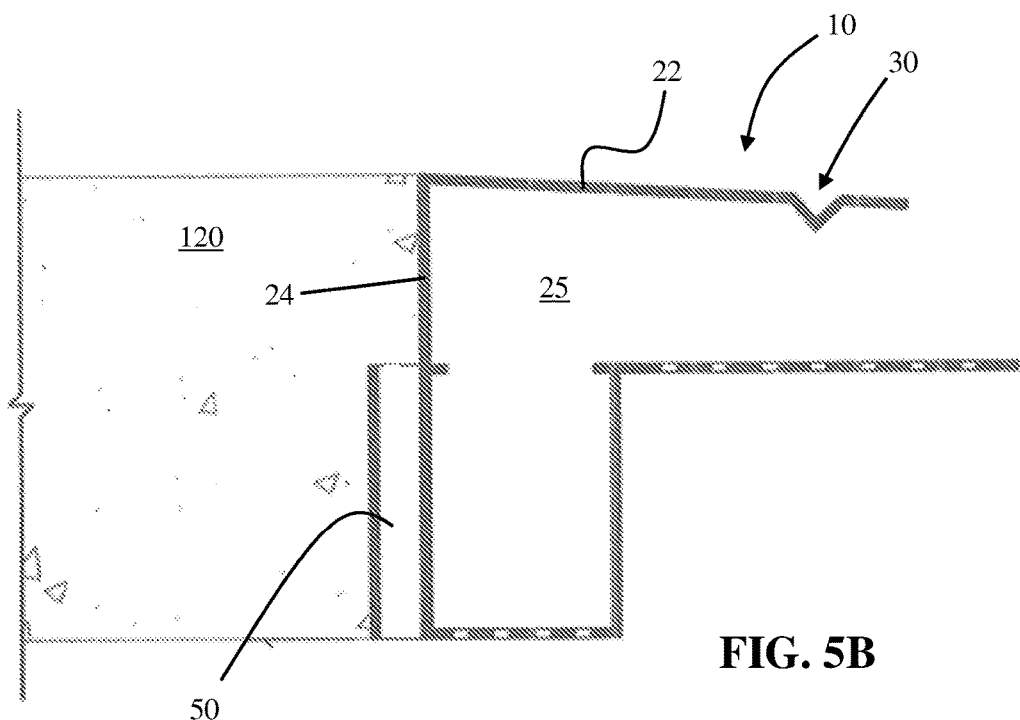
FIG. 5B is a side cross sectional view of the landscape bordering system illustrated in FIG. 5A with a concrete border illustrated.

FIGS. 5A and 5B illustrated yet another feature of some embodiments of the present invention. For example, an anchoring channel 50 may be included on the exterior of the device 10. In the embodiment shown, the anchoring channel 50 is vertically disposed along the exterior of back wall 24, however, other locations are contemplated. In any event, the anchoring channel 50 includes an opening through which a spike or other anchor (not shown) can be disposed. The spike or other anchor may be inserted through the anchoring channel 50 and into the surrounding ground in order to secure or anchor the device. In the case where the device 10 abuts against concrete, such as, for example, a walkway, sidewalk, driveway, patio, etc., the spike or anchor may be inserted through the anchoring channel 50 prior to poring the concrete or pavement or prior to installing bricks, for example.

In addition, two bordering devices 10 of the present invention can be used to frame or form a sidewalk, walkway, driveway, etc. prior to pouring the concrete, for example. In particular, many concrete sidewalks, walkways, etc. are "formed" by placing wood siding along the edges of where the sidewalk will be defined. The wood siding acts as an outer frame within which the concrete is poured in order to construct the walkway. In some cases, two or more landscape bording devices 10 of the present invention can be used in place of, or instead of the wood siding in order to form or frame the sidewalk or walkway. Particularly, with reference to FIG. 5B, the back surface 24 can function as a siding for the walkway or driveway, for example, where the concrete 120 is poured. Another parallel device 10 can be positioned on the other side (not shown) defining an area between the back surfaces 24 of parallel devices 10 within which the concrete can be poured. In addition, as provided above, anchoring channel 50 may be used to stake or anchor the device(s) down, thereby forming the sidewalk, walkway, etc. prior to pouring the concrete.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.
What is claimed is:

1. A landscape border comprising:
  a body defining a top surface, a back surface, a lower bottom surface, an intermediate bottom surface, and an upward surface,
  said top surface, said back surface, said lower bottom surface, said intermediate bottom surface and said upward surface at least partially defining an interior portion, said interior portion comprising a lower extended portion and an intermediate portion,
  said top surface comprising a front edge disposable along a lawn, and a back edge terminating at said back surface, said lower bottom surface, said intermediate bottom surface, and said back surface being disposed underground,
  said lower extended portion of said interior portion of said body is disposed below a mounting assembly and is defined by a portion of said back surface, said lower bottom surface, and said upward surface,
  said lower bottom surface comprises a plurality of drainage holes disposed there through,
  said intermediate portion is at least partially defined by said intermediate bottom surface, said intermediate bottom surface comprising a plurality of anchoring holes adapted to allow plant roots to grow there through for anchoring said body to the ground, and
  a channel disposed along at least a portion of an outer exposed side of said top surface of said body, said channel being at least substantially proximate and parallel to said front edge of said top surface.

2. The landscape border as recited in claim 1 wherein said at least one channel is disposed substantially along said outer exposed side of said top surface.

3. The landscape border as recited in claim 1 wherein said at least one channel is continuously disposed along said outer exposed side of said top surface between oppositely disposed side edges thereof.

4. The landscape border as recited in claim 1 wherein said channel comprises a v-shaped configuration.

5. The landscape border as recited in claim 1 wherein said mounting assembly is configured to engage a corresponding mounting portion of a module selectively disposed therein.

6. The landscape border as recited in claim 5 wherein said mounting assembly continuously extends longitudinally between opposite terminating sides of said body, wherein the module can be selectively disposed at any location along said top surface of said body between said oppositely disposed side edges and in an aligned relation with said mounting assembly.

7. The landscape border as recited in claim 5 wherein said mounting assembly comprises at least one rail disposed longitudinally within said interior portion of said body.

8. The landscape border as recited in claim 6 wherein said mounting assembly comprises at least two rails disposed longitudinally within said interior portion of said body, said at least two rails defining an opening there between through which the module is disposed.

9. A landscape border comprising:
   a body comprising an interior portion defined by a top surface, a back surface, and at least one bottom surface, said top surface, said back surface and said at least one bottom surface at least partially defining and an interior portion,
   said top surface comprising a front edge disposable along a lawn, and a back edge terminating at said back surface, said at least one bottom surface and said back surface being disposed underground while said top surface is at least partially exposed above ground,
   a channel continuously disposed longitudinally along an outer exposed side of said top surface of said body, said channel being disposed at least substantially proximate to said front edge of said top surface and adapted to receive an amount of herbicide therein,
   a mounting assembly disposed within said interior portion of said body for selectively engaging a corresponding portion of a module selectively installed through said top surface and at least partially into said interior portion of said body,
   wherein said mounting assembly continuously extends longitudinally between opposite terminating sides of said body, wherein the module can be selectively disposed at any location along said top surface of said body and in an aligned relation with said mounting assembly,
   wherein the module comprises a sprinkler head, and wherein a water pipe is disposed within said interior portion of said body and fluidically connected to the sprinkler head.

10. The landscape border as recited in claim 9 wherein said at least one bottom surface comprises a plurality of holes adapted to allow plant roots to grow there through for anchoring said body to the ground.

11. The landscape border as recited in claim 9 further comprising at least one anchoring channel configured to receive an anchor there through.

12. The landscape border as recited in claim 11 wherein said anchoring channel is disposed vertically along a portion of said back surface.

* * * * *